United States Patent [19]

Hanebrink

[11] Patent Number: 4,736,506

[45] Date of Patent: Apr. 12, 1988

[54] BAT GRIP INSTALLATION DEVICE

[75] Inventor: Daniel E. Hanebrink, Fawnskin, Calif.

[73] Assignee: Tacki-Mac Grips, Inc., Canoga Park, Calif.

[21] Appl. No.: 917,217

[22] Filed: Oct. 9, 1986

[51] Int. Cl.[4] .............................................. B23P 19/02
[52] U.S. Cl. ...................................................... 29/235
[58] Field of Search ................. 29/234, 235, 280, 282, 29/450; 269/254 R

[56] References Cited

U.S. PATENT DOCUMENTS

| | | | |
|---|---|---|---|
| 201,096 | 3/1878 | Cowles | 29/234 |
| 1,408,039 | 2/1922 | Snyder | 29/235 |
| 1,488,901 | 4/1924 | Armstrong | 29/235 |
| 2,830,361 | 4/1958 | Bruner | 29/235 |
| 2,840,896 | 7/1958 | Edwards | 29/234 X |
| 3,946,480 | 3/1976 | Dienes | 29/235 |
| 4,068,364 | 1/1978 | Tharp et al. | 29/235 |
| 4,130,928 | 12/1978 | von der Heyde et al. | 29/235 X |
| 4,466,166 | 8/1984 | Hogarth | 29/235 |

FOREIGN PATENT DOCUMENTS 19883 of 1905 United Kingdom ................. 29/235

Primary Examiner—Frederick R. Schmidt
Assistant Examiner—Judy J. Hartman
Attorney, Agent, or Firm—Kelly, Bauersfeld & Lowry

[57] ABSTRACT

A device is provided for use in installing a resilient replacement hand grip onto the handle portion of a manual implement particularly such as a baseball or softball bat after a worn grip has been removed. The installation device comprises a circular array of elongated leaf-type guide springs suspended from an upper platform to define a cylindrical column for supporting a sleeve-shaped replacement hand grip in a partially radially expanded condition. The knob end of the bat adjacent the handle portion is inserted downwardly through a central opening in the upper platform and further through the guide spring cylindrical column to a stop position seated within an aligned recess in a lower platform positioned slightly below the guide spring column and the supported hand grip. The guide springs are withdrawn upwardly through the upper platform leaving the replacement hand grip in place on the bat.

19 Claims, 2 Drawing Sheets

BAT GRIP INSTALLATION DEVICE

BACKGROUND OF THE INVENTION

This invention relates to apparatus for use in installing a sleeve-shaped hand grip onto the handle portion of a manual implement such as a baseball or softball bat or the like. More particularly, this invention relates to a relatively lightweight and inexpensive bat grip installation device for quickly and easily mounting a resilient sleeve-shaped hand grip over the knob end of a bat to a position about the bat handle portion.

A variety of manual implements such as baseball and softball bats, sports racquets, tools, and the like, are commonly provided with a so-called hand grip installed about a handle portion of the implement to enhance comfortable and secure grasping of the implement during use. With many such implements, the hand grip takes the form of a resilient or elastomeric material formed generally into the shape of a cylindrical sleeve having a size to fit snugly and substantially without slippage about the handle portion of the implement. When grasped by the user, the resilient grip provides a comfortable, slightly cushioned structure which will not readily slip within the user's hand irrespective of the presence of perspiration or dirt on the grip.

Sleeve-shaped resilient hand grips have in recent years become widely used with baseball and softball bats, particularly with bats constructed from aluminum. However, the handle portion of a bat is typically substantially smaller in diameter than either the barrel portion or the knob end of the bat. Accordingly, aluminum bats are normally manufactured initially without a knob end to permit sliding of the sleeve-shaped grip onto the bat handle portion, after which the knob end is welded or otherwise attached to the handle portion. Once the bat knob end is installed, nondestructive removal of the hand grip over the diametrically larger knob end or the barrel portion of the bat is virtually impossible.

One major problem encountered with aluminum bats and other implements provided with a sleeve-shaped resilient hand grip is that the grip will normally wear out long before the implement. When the hand grip wears out, installation of a new replacement grip can be an extremely difficult and sometimes impossible task. For example, with aluminum baseball or softball bats, it is possible to cut and remove the worn grip from the bat, but sliding installation of a replacement grip over the bat knob end or barrel portion generally cannot be accomplished by the average consumer, since such installation normally requires the bat knob end to be severed from the handle portion, followed by rewelding of the knob end after the grip is installed. As a result, when the hand grip wears out, bat users are commonly faced with the undesirable choices of discarding the bat, continuing bat use without a hand grip, or using a less satisfactory grip, such as a tape wrap or the like.

In addition, the popularity of resilient sleeve hand grips with metal baseball and softball bats has rendered it desirable to produce conventional wooden bats with a similar soft and resilient hand grip. However, the knob end of a wooden bat is formed integrally with the remainder of the bat and thus cannot be removed or later reattached to permit easy mounting of a resilient sleeve hand grip. As a result, wooden bats have not been available with soft resilient sleeve hand grips.

Accordingly, there has existed a significant need for a relatively simple and inexpensive apparatus and method for use in quickly and easily installing a sleeve-shaped resilient hand grip onto the handle portion of a manual implement particularly such as a baseball or softball bat, wherein the hand grip can be moved over the relatively large knob end of the bat for snug placement about a comparatively smaller handle portion. The present invention fulfills this need and provides further related advantages.

SUMMARY OF THE INVENTION

In accordance with the invention, a relatively simple, inexpensive, and lightweight installation device is provided for quickly and easily mounting a sleeve-shaped resilient hand grip about a handle portion of a manual implement. The installation device is particularly designed for use with baseball and softball bats having a relatively small diameter handle portion interposed between a knob end and a barrel portion of larger diameter. The device includes means for supporting a sleeve-shaped grip in a diametrically partially expanded condition during sliding movement of the bat through the hand grip and into seated engagement with stop means to align the handle portion longitudinally within the grip. The support means is then removed to release and leave the grip snugly in place about the bat handle portion.

In a preferred form, the installation device includes an elevated upper platform from which a circularly arranged array of elongated leaf-type guide springs are removably supported to define a generally vertical cylindrical column. These guide springs are preferably nonlinear in shape to define the column having an inside diameter at the upper platform generally greater than the diameter of the bat knob end and converging downwardly toward a smaller inside diameter generally corresponding the the diameter of the bat handle portion. A sleeve-shaped soft resilient hand grip is slidable upwardly for supported engagement about the guide springs ready for reception of the bat knob end. A hexagonal retainer plug can be inserted downwardly into a lower region of the spring-formed column to radially align and spread the guide springs for slightly expanding the grip, thereby securely retaining the grip about the guide springs.

The bat is insertable knob end first through a central opening in the upper platform downwardly into the cylindrical column formed by the guide springs. The bat end slides smoothly along and radially spreads the guide springs which in turn space the bat from the hand grip and prevent longitudinal movement of the grip along with the bat. The knob end of the bat ultimately displaces the retainer plug within the guide springs and exits the lower end of the cylindrical column for seated reception into the stop means defined by an upwardly open recess in a lower platform. This stop recess is positioned by the lower platform slightly below the lowermost ends of the guide springs and the supported hand grip such that the hand grip is positioned about the bat handle portion with a controlled longitudinal spacing from the knob end. The guide springs are then withdrawn from between the handle portion and hand grip by removal upwardly through the platform, with such removal being facilitated by upper pull rings on the guide springs which may be grasped by a pulling key, thereby leaving the grip in place on the bat.

According to a further feature of the invention, the upper and lower platforms comprise a portion of a relatively lightweight and portable assembly supported in predetermined spatial relation by a plurality of legs having lengths longer than the sleeve-shaped grip to be installed on the bat. The platforms and legs can be connected together in a manner permitting rapid assembly for use followed by relatively easy disassembly for storage until a subsequent use is required. Accordingly, the invention can be used to install sleeve-shaped grips onto new bats or to install replacement grips onto used bats.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
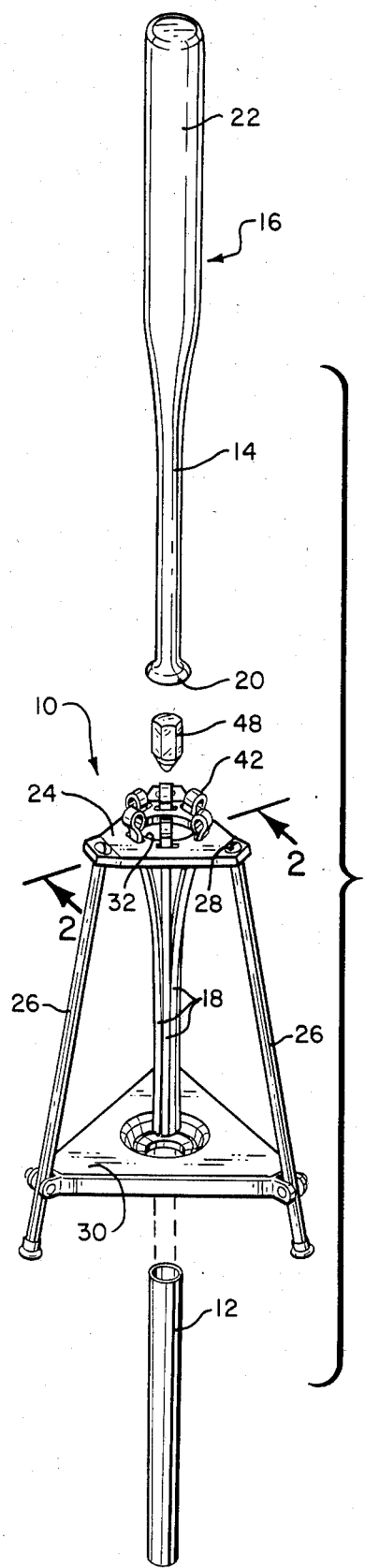
FIG. 1 is an exploded perspective view of a bat grip installation device embodying the novel features of the invention and illustrating initial steps in placement of a resilient hand grip onto the handle portion of a baseball or softball bat.

As shown in the exemplary drawings, an installation device referred to generally by the reference numeral 10 is provided for quickly and easily placing a resilient sleeve-shaped hand grip 12 onto the handle portion 14 of a manual implement 16 particularly such as a common baseball or softball bat. The installation device 10 includes a suspended array of elongated leaf-type guide springs 18 which cooperate in supporting the resilient grip 12 in a partially radially expanded condition during passage of the bat 16 through a column defined by the springs to a stopped position with the handle portion 14 predeterminably located within the hand grip 12, after which the guide springs 18 are quickly and easily removed leaving the grip 12 in place on the bat handle portion.

The bat grip installation device 10 of the present invention provides a relatively simple, lightweight, portable, and easy-to-use device facilitating placement of a high quality and highly desirable resilient hand grip 12 formed from an elastomeric composition or the like which can be selectively molded or extruded into a generally sleeve-shaped and soft configuration for installation onto the handle portion of a wide variety of different types of manual implements, such as bats, sports racquets, tools, and the like. The installation device 10 is particularly useful for placing such hand grips 12 onto the relatively small diameter handle portion 14 of a typical baseball or softball bat having a comparatively larger diameter knob end 20 adjacent the handle portion and an opposite, comparatively larger diameter barrel portion 22. The device permits rapid and simplified installation of a new hand grip onto a newly manufactured bat or implement or a replacement grip onto a used bat or implement after an original grip has become excessively worn irrespective of the presence of the relatively large bat knob end 20. The installation device 10 can thus be used to apply resilient sleeve hand grips onto modern metal or conventional wooden baseball and softball bats as well as a variety of other types of tools and implements.

Figure 2:
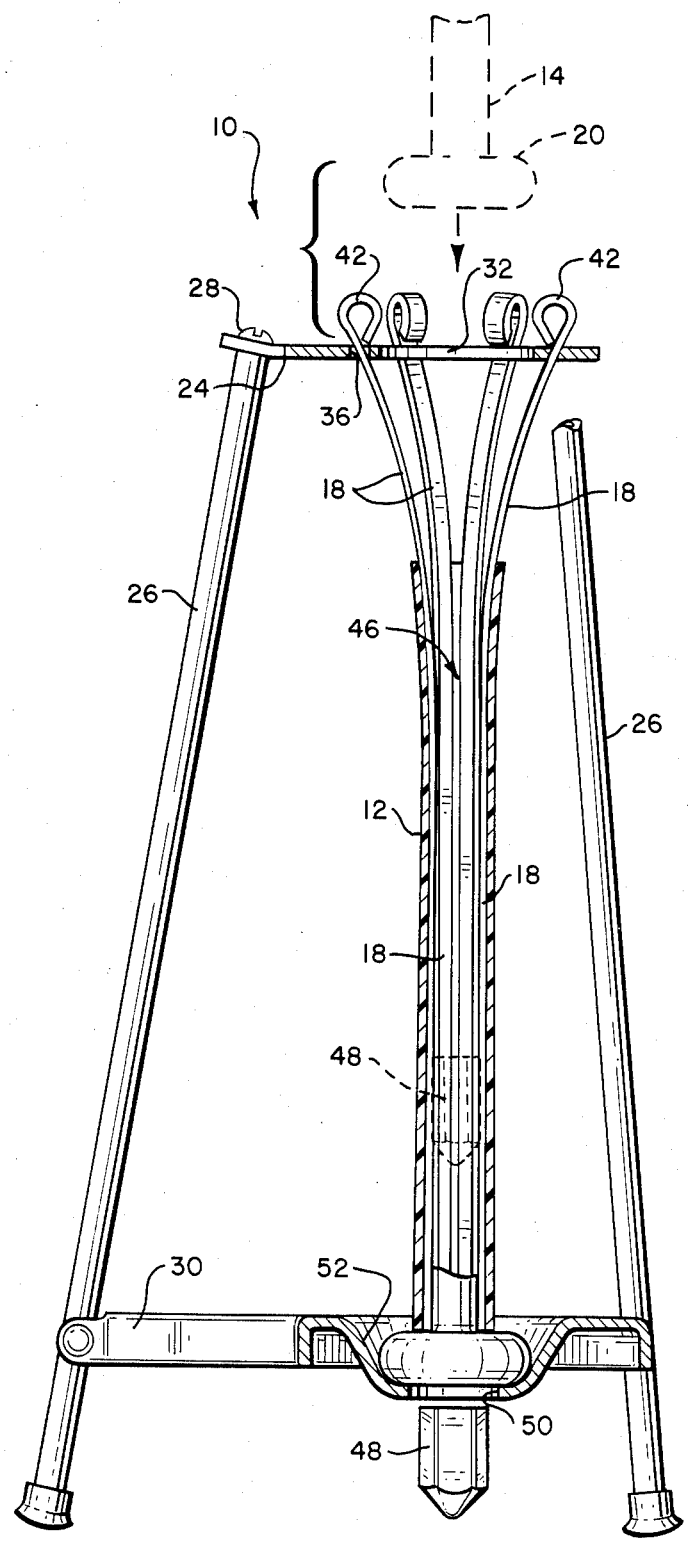
FIG. 2 is an enlarged vertical section taken generally on the line 2—2 of FIG. 1, with portions broken away to illustrate construction details of the installation device.

The bat grip installation device 10 is illustrated in one preferred form to include a generally triangular upper platform 24 connected as its corners to a trio of legs 26, wherein the upper platform and legs are conveniently constructed from a lightweight material, such as steel or aluminum, for high portability. In the exemplary form as shown in FIG. 2, the corners of the platform 24 are tilted upwardly and include holes for downward reception of mounting bolts 28 threaded into the upper ends of the legs 26, thereby orienting the legs to spread outwardly in a downward direction and provide a sturdy, broad area support base. Added structural rigidity obtained by a lower platform 30 interconnecting the legs 26 intermediate their heights in any suitable manner, such as by welding or by additional bolts or the like if disassembly of the device is desired.

The upper platform 24 is shaped to include a central opening 32 having a generally circular diametric size sufficient for endwise downward passage of the knob end 20 and the handle portion 14 of a bat 16 or other implement. This central opening 32 is generally centered within a generally circular concentric array of relatively smaller, generally elliptical-shaped slots 36, six of which are depicted in the illustrative embodiment and shown best in FIG. 3. These slots 36 are oriented with their longitudinal axes turned generally normal to a radius of the central opening 32.

Figure 3:
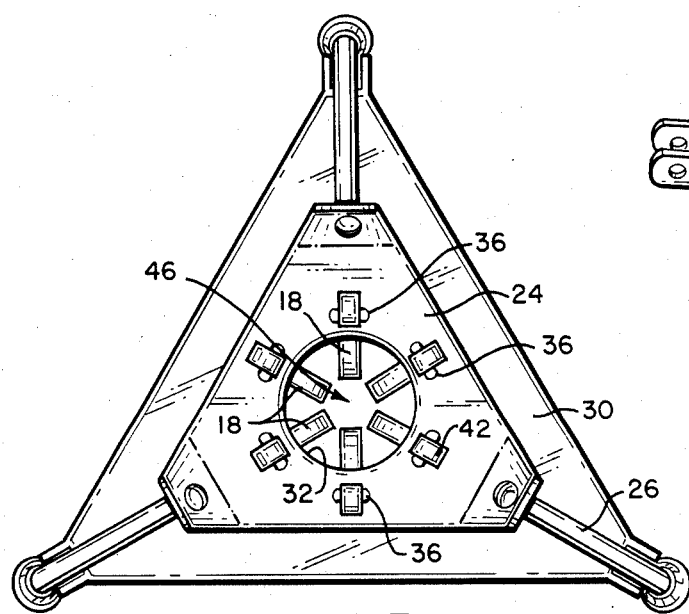
FIG. 3 is a top plan view of the installation device.

The platform slots 36 are sized for sliding rception of the leaf-type guide springs 18, as shown best in FIGS. 1–3. These guide springs 18 comprise elongated, generally strip-shaped members of a relatively stiff but flexible spring material, such as steel or aluminum strips, to have an overall length at least slightly greater than the length of a grip 12 to be installed but terminating in slight spaced relation above the lower platform 30. The guide springs 18 are received downwardly and individually through the platform slots 36 and are shaped to have a nonlinear geometry including, in the preferred from, a curvilinear upper portion 38 set generally at an angle with respect to a generally linear lower portion 40 (FIG. 10), wherein the lower portions 40 of the guide spring extend approximately over about two-thirds of the guide spring lengths.

The guide springs 18 are receivable downwardly through the platform slots, as viewed in FIG. 2, 3, 7 and 8, and include upper ends 42 rolled over for easy manual grasping. These guide spring upper ends 42 are larger than the platform slots 36 and thus support the guide springs 18 in a normal operating position suspended from the upper platform 24. In this normal operating position, the guide springs 18 cooperate to define a generally cylindrical column 46 having a diametric size which decreases downwardly from the upper platform 24 throughout the spring upper portions 38 from a diametric size greater than the bat knob end 20 or barrel portion 22 and then remains substantially uniform with a size generally corresponding with the bat handle portion 14 throughout the spring lower portions 40.

The suspended array of guide springs 18 provides a generally cylindrical and expansible support structure about which the sleeve-shaped hand grip 12 can be drawn upwardly, as viewed in FIG. 1 to a supported position depicted in FIG. 2. Secure support of the hand grip 12 about the guide springs 18 is enhanced by a generally hexagonal retainer plug 48 (FIGS. 2, 7 and 8) sized for reception downwardly through the upper platform central opening 32 and further for sliding reception to a position engaging and slightly spreading the lower portions 40 of the guide springs 18. The diametric size of this retainer plug 48 is chosen to align and spread the guide springs 18 sufficiently for partial radial expansion of the hand grip 12, thereby securely supporting the hand grip 12 in place. A narrow diameter push rod 49 shown in FIG. 11 may be provided to push the plug 48 into place.

Figure 4:
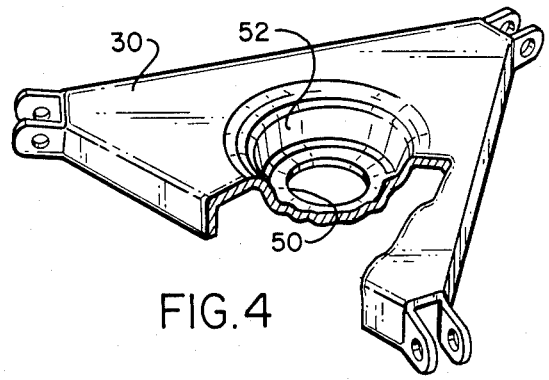
FIG. 4 is a fragmented perspective view illustrating one preferred geometry from a lower platform forming part of the installation device.
Figures 5, 6:
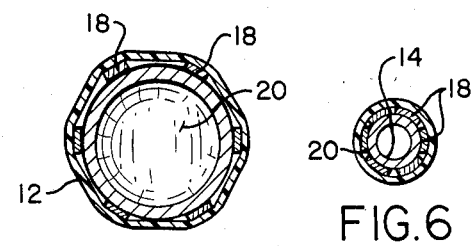
FIG. 5 is a horizontal section taken generally on the line 5—5 of FIG. 7.
FIG. 6 is a horizontal section taken generally on the line 6—6 of FIG. 7.
Figures 7, 8, 9, 10, 11:
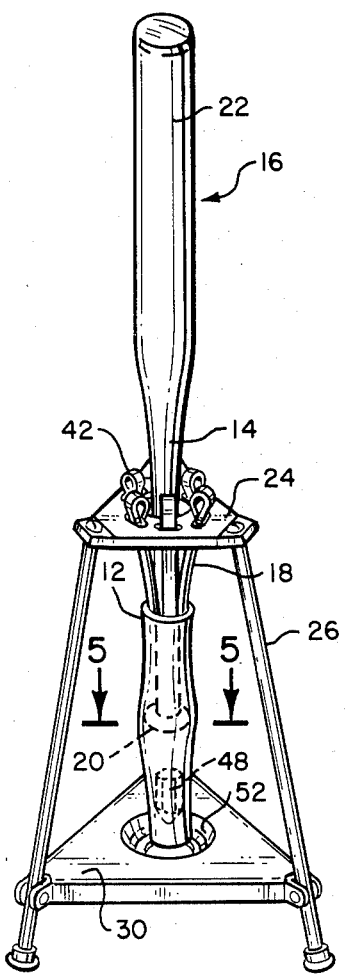
FIG. 7 is a perspective view of the installation device similar to FIG. 1 and illustrating a further step in the placement of a hand grip onto the bat handle portion.
FIG. 8 is another perspective view similar to FIG. 1 and depicting further steps in installation of a hand grip.
FIG. 9 is an elevation view depicting an exemplary pulling key for use with the invention.
FIG. 10 is a perspective view depicting one of the guide springs used with the installation device.
FIG. 11 is an elevation view depicting a push rod for use with the invention.

With the hand grip 12 supported about the guide springs 18, the bat 16 is insertable knob end first through the upper central opening 32. The bat knob end 20 initially enters the larger diameter upper region of the spring-defined column 46, and, upon further downward movement, slidingly bears against the guide springs 18 to provide a localized bulging of the column, as depicted in FIGS. 5 and 7. Still further downward movement of the bat displaces the knob end 20 to a position permitting the retainer plug 48 to fall from the column 46 through an aligned central opening 50 in the lower platform 30. Further downward bat displacement causes the knob end of the bat to exit the spring-formed column and to seat within an upwardly open stop recess 52 (FIGS. 2, 4 and 8) formed centrally in the lower platform 30. Importantly, in this position, the knob end 20 is spaced slightly below the lowermost ends of the guide springs 18 and the hand grip 12.

The bat knob end movement is accompanied, of course, by a corresponding downward displacment of the handle portion 14 to a desired predetermined position within the hand grip 12. Importantly, throughout the downward passage of the bat through the cylindrical column 46, the guide springs 18 maintain the bat in radial separation from the hand grip 12 (FIG. 5 and 6) and further provide a relatively low friction structure for facilitated sliding bat movement.

With the resilient hand grip 12 in the desired position about the bat handle portion 14, as viewed in FIG. 8, the guide springs 18 are removable quickly and easily from their positions radially between the grip 12 and handle portion 14 by pulling upwardly on the spring upper ends 42. More specifically, grasping and upward pulling upon the ends 42 one-at-a-time draws the guide springs 18 upwardly through the platform slots 36 and removes them from within the grip 12 in a manner without displacing the grip on the bat handle portion. A pulling key 56 (FIGS. 8 and 10) is conveniently provided for easy manual grasping and includes a hooked lower end for engaging spring upper ends 42 for facilitated manual spring withdrawal. The bat 16 can then be withdrawn from the upper platform central opening 32 and used in a normal manner until subsequent grip wear requires installation of a subsequent replacement grip.

The bat grip installation device 10 of the present invention thus provides a relatively simple, inexpensive, and easy-to-use device for placing a sleeve-shaped hand grip of the highly desirable soft resilient type without concern for the relatively large knob end 20 conventionally present with bats.

While a particular form of the invention has been illustrated and described, it will be apparent that various modifications and improvements can be made without departing from the spirit and scope of the invention. Accordingly, no limitation upon the invention described herein is intended, except as set forth in the appended claims.

What is claimed is:

1. An installation device for use in installing a sleeve-shaped resilient hand grip onto the handle portion of a manual implement, comprising:
   an elevated platform having a central opening therein for endwise reception of the implement handle portion and a plurality of relatively smaller slots formed in an array about the central opening;
   a plurality of elongated, generally strip-shaped guide springs for respective reception downwardly through the slots in said platform;
   means for suspending said guide springs from said platform with the upper end of each of said guide springs generally aligned with a respective one of the platform slots whereby said guide springs cooperatively define a generally cylindrical column for supported reception of the resilient hand grip thereabout;
   the implement handle portion being receivable downwardly through the platform central opening and further through said column defined by said guide springs; and
   stop means positioned below the lowermost ends of said grip springs and the lowermost end of the hand grip support thereabout, said stop means engaging said handle portion to halt downward movement thereof through said column to position the hand grip concentrically and in a predetermined position about the handle portion with said guide springs disposed radially between the hand grip and handle portion, said guide springs being removable upwardly through said platform to remove said guide springs from between the hand grip and handle portion.

2. The installation device of claim 1 including means for reception into said column prior to reception of the implement handle portion for displacing said guide springs generally radially outwardly relative to each other for partially expanding the hand grip when the hand grip is received about said guide springs.

3. The installation device of claim 2 wherein said displacing means comprises a generally hexagonal retainer plug.

4. The installation device of claim 1 including a plurality of legs depending from said platform for supporting said platform in an elevated position.

5. The installation device of claim 4 wherein said stop means comprises lower platform means supported by said legs at a position spaced below said platform by a distance greater than the length of the hand grip.

6. The installation device of claim 1 wherein the implement is a bat having a knob end generally adjacent the handle portion, said knob end having a diametric size relatively greater than the diametric size of the handle portion, and wherein the platform central opening is sized for reception of the bat knob end.

7. The installation device of claim 6 wherein said stop means comprises means forming a stop seat spaced at least slightly below the lowermost end of said guide springs and the hand grip supported thereabout.

8. The installation device of claim 1 wherein said suspending means comprises a plurality of enlarged upper ends on said guide springs, said guide spring upper ends having a size sufficient to prevent passage thereof through the platform slots and being graspable for withdrawing said guide springs upwardly through the platform slots to remove said guide springs from between the hand grip and handle portion.

9. The installation device of claim 8 further including a pulling key for facilitated grasping and pulling of said guide spring upper ends.

10. The installation device of claim 1 wherein said guide springs each include a generally linear lower portion and an upper portion oriented generally angularly to extend generally upwardly and outwardly relative to said lower portion, said guide springs being suspended from said platform to define said column having a diametric size at its upper end greater than the size of the platform central opening and tapering in a downard direction toward a diametric size at said spring lower portions generally corresponding with the diametric size of the implement handle portion.

11. The installation device of claim 10 wherein the upper portion of each of said guide springs has a generally curvilinear shape.

12. The installation device of claim 1 wherein the platform slots are arranged in a generally circular array centered generally about the platform central opening.

13. An installation device for use in installing a sleeve-shaped resilient hand grip onto the handle portion of a bat having a knob end with a diametric size greater than said handle portion, the device comprising:
a platform having a central opening therein for endwise reception of the bat handle portion;
grip support means for supporting the hand grip relative to said platform in a position with one end of the hand grip generally aligned with the platform central opening, the handle portion being receivable knob end first through the platform central opening and further through the hand grip to a position with the hand grip disposed about the handle portion;
said grip support means including means for separating the handle portion from and for slidably guiding the handle portion through the hand grip, said grip support means further including a plurality of elongated, generally strip-shaped guide springs, each having one end adapted for removable coupling to said platform, said guide springs extending from one side of said platform to define a generally cylindrical column centered generally on the platform central opening;
plug means for reception into said column prior to reception of the handle portion for displacing said guide springs generally radially outwardly relative to each other for partially expanding the hand grip when the hand grip is received about said guide springs; and
stop means for engaging the knob end of the handle portion to stop movement of the handle portion through the hand grip in a predetermined position relative to the hand grip, said stop means having an opening therein of a size sufficient to permit said plug means to fall therethrough upon reception of the bat handle portion through the hand grip.

14. The installation device of claim 13 including means for removing said grip support means from between the hand grip and handle portion when the handle portion is moved to said position with the hand grip disposed thereabout.

15. The installation device of claim 13 wherein said guide springs are formed from a material for relatively low friction sliding contact with the bat.

16. An installation device for use in installing a sleeve-shaped resilient hand grip onto the handle portion of a bat having a knob end with a diametric size greater than the handle portion, the device comprising:
a platform having a central opening therein sized for endwise reception of the bat and a plurality of relatively smaller slots arranged in generally circular array about and centered generally on the central opening;
means for supporting said upper platform in a generally horizontally oriented, elevated position;
a plurality of elongated, generally strip-shaped guide springs sized for sliding reception respectively through the slots in said upper platform and including upper ends with suspension means for engaging the upper side of said upper platform when said guide springs are received downwardly through the platform slots for suspending said guide springs from the upper platform in a generally circular array defining a generally cylindrical column;
said guide springs receiving thereabout and supporting the hand grip; and
a lower platform and means for supporting said lower platform in predetermined spaced relation below the lowermost ends of said guide springs and the hand grip supported thereabout;
the bat being receivable knob end first downwardly through said upper platform central opening and said column to a position with the knob end positioned below said guide springs and seatingly stopped upon said lower platform and with the hand grip disposed about the handle portion, said guide springs slidably guiding and radially separating the handle portion with respect to the hand grip, said guide springs being removable from between the hand grip and handle portion.

17. The installation device of claim 16 wherein said upper and lower platform support means comprises a plurality of support legs.

18. The installation device of claim 16 wherein said guide springs are shaped to define said column with a diametric size progressively decreasing in a downward direction from said platform to a lower portion of said column having a generally constant diametric size generally corresponding with the diametric size of the handle portion.

19. The installation device of claim 16 further including a generally hexagonal retainer plug receivable into said column and having a diametric size to align and spread said guide springs sufficiently to retain the hand grip thereabout prior to reception of the bat into said column, said plug being displaced by the bat upon bat reception into said column, said lower platform having a central opening therein of a size sufficient to permit said plug to fall therethrough.

* * * * *